(12) United States Patent
Doi et al.

(10) Patent No.: US 6,620,229 B2
(45) Date of Patent: Sep. 16, 2003

(54) INK JET RECORDING LIQUID AND INK JET RECORDING METHOD

(75) Inventors: Takatsugu Doi, Minamiashigara (JP); Hiroshi Inoue, Minamiashigara (JP); Ken Hashimoto, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/417,477

(22) Filed: Oct. 13, 1999

(65) Prior Publication Data
US 2003/0008080 A1 Jan. 9, 2003

(30) Foreign Application Priority Data
Nov. 6, 1998 (JP) ............................................ 10-332097

(51) Int. Cl.$^7$ .............................. C09D 11/00; B41J 2/01
(52) U.S. Cl. ...................... 106/31.6; 524/556; 524/560; 524/577; 427/466; 427/469
(58) Field of Search ................ 106/31.6; 524/556, 524/560, 577; 427/466, 469

(56) References Cited

U.S. PATENT DOCUMENTS

| | | | |
|---|---|---|---|
| 5,085,698 A | | 2/1992 | Ma et al. ........................ 106/20 |
| 5,172,133 A | | 12/1992 | Suga et al. .................... 346/1.1 |
| 5,221,334 A | * | 6/1993 | Ma et al. .................... 106/20 D |
| 5,571,311 A | | 11/1996 | Belmont et al. ........... 106/20 R |
| 5,607,999 A | * | 3/1997 | Shimizu et al. .............. 524/503 |
| 5,658,376 A | * | 8/1997 | Noguchi et al. .......... 106/31.43 |
| 6,011,098 A | * | 1/2000 | Kashiwazaki et al. ....... 425/377 |
| 6,114,411 A | * | 9/2000 | Nakamura et al. .......... 523/161 |

FOREIGN PATENT DOCUMENTS

| | | | |
|---|---|---|---|
| JP | 55-65269 | 5/1980 | |
| JP | 56147871 | * 11/1981 | ........... C09D/11/00 |
| JP | 56-147871 | 11/1981 | |
| JP | 6-92008 | 4/1994 | |
| JP | 6-136307 | 5/1994 | |
| JP | 07310038 | * 11/1995 | ........... C09D/11/00 |
| JP | 8-3498 | 1/1996 | |
| JP | 8-81646 | 3/1996 | |
| JP | 08081646 | * 3/1996 | ........... C09D/11/00 |
| JP | 9-194775 | 7/1997 | |

* cited by examiner

*Primary Examiner*—Kelechi Egwim
(74) *Attorney, Agent, or Firm*—Morgan, Lewis & Bockius LLP

(57) ABSTRACT

An ink jet recording liquid of high optical density, good rub resistance, and excellent feathering and long-term preservation stability when the liquid is used for printing on plain paper is used in an ink jet recording method. In the ink jet recording liquid which contains a pigment, water soluble organic solvent, and water as the essential components, and additionally containing water soluble resin and/or surfactant, 1) the temporal change rate of dynamic contact angle on plain paper is in a range from 0.5 to 3.5 degrees/second, 2) the number average particle diameter in the ink jet recording liquid is in a range from 15 to 100 nm, and 3) the volume average particle diameter in the ink jet recording liquid is in a range from 30 to 200 nm. The above-mentioned ink jet recording liquid is printed by means of ink jet recording.

10 Claims, No Drawings

INK JET RECORDING LIQUID AND INK JET RECORDING METHOD

BACKGROUND OF THE INVENTION

1. Field of Utilization

The present invention relates to an ink jet recording liquid and an ink jet recording method.

2. Description of the Related Art

Because the so-called ink jet printer in which a liquid or molten solid ink is jetted from a nozzle, slit, or porous film for recording on a paper, cloth, or film is advantageous in that a printer is small in size, inexpensive in price, and quiet in operation, the ink jet printer has been used popularly as the black monochromatic or full color printer. In particular, the so-called piezo ink jet system in which a piezo-electric element is used, and the so-called thermal ink jet system in which liquid droplets are formed by applying thermal energy for recording are advantageous because of high speed printing and high resolution printing.

Though the conventional ink which uses water soluble dye used generally for the ink jet recording system is excellent in long term preservation stability, the ink is disadvantageous in water resistance and light resistance. On the other hand, the ink which uses pigment is excellent in water resistance and light resistance, and also gives high optical density and no bleeding picture quality and very promising, and many proposals have been presented recently and used practically. For example, Japanese Published Unexamined Patent Application No. 56-147871 proposes a recording liquid comprising an aqueous liquid containing pigment, polymer dispersant and non-ionic surfactant. U.S. Pat. No. 5,085,698 Specification and U.S. Pat. No. 5,221,334 Specification propose that AB or BAB block copolymer is used as a dispersant for pigment. Furthermore, U.S. Pat. No. 5,172,133 Specification proposes use of specific pigment, water soluble resin, and solvent.

On the other hand, U.S. Pat. No. 5,571,311 discloses a method in which the substitute containing water dissolving group is introduced to carbon black, Japanese Published Unexamined Patent Application No. 8-81646 discloses a method in which water soluble monomer is polymerized on the surface of carbon black, and Japanese Published Unexamined Patent Application No. 8-3498 discloses a method in which carbon black is subjected to oxidation treatment. Furthermore, Japanese Published Unexamined Patent Application No. 9-194775 discloses a method in which an ink containing oxidized carbon black and ternary copolymer consisting of acrylic acid, styrene, and methylstyrene.

However, it has been known that the pigment ink is generally disadvantageous in rub resistance. Japanese Published Unexamined Patent Application No. 55-65269 discloses a method for improving the rub resistance by adding a surfactant in a ink, if this method is applied to a pigment ink, though the rub resistance is improved, the sufficient image density cannot be obtained and feathering occurs possibly. As described hereinabove, a pigment ink which is excellent in optical density, rub resistance, feathering, and long term preservation stability has not been obtained.

Accordingly, it is the object of the present invention to provide a pigment based ink jet recording liquid which is excellent in optical density, rub resistance, feathering, and long term preservation stability when the ink is used for printing on plain paper, and to provide a recording method in which the ink jet recording liquid described hereinabove is used.

SUMMARY OF THE INVENTION

The inventors of the present invention were engaged in work to solve the above-mentioned problem, and as a result of enthusiastic consideration, found that it was essential to satisfy the conditions described hereunder to obtain an ink jet recording liquid which was excellent in optical density, rub resistance, feathering, and long-term preservation stability, and accomplished the present invention.

In detail, the present invention provides an ink jet recording liquid containing pigment, water soluble organic solvent, and water as the essential components, and additionally containing water soluble resin and/or surfactant, wherein
1) the temporal change rate of dynamic contact angle on a plain paper is in a range from 0.5 to 3.5 degrees/second,
2) the number average particle diameter of dispersed particles in the ink jet recording liquid is in a range from 15 to 100 nm, and
3) the volume average particle diameter of dispersed particles in the ink jet recording liquid is in a range from 30 to 200 nm, the ink jet recording liquid in which the water soluble resin is a polymer dispersion, and pigment is dispersed by the water soluble resin, the ink jet recording liquid in which the pigment is water self-dispersible pigment, and the water soluble resin and/or surfactant is anionic or nonionic, the ink jet recording liquid in which the water soluble resin comprises copolymer having a hydrophilic component and a hydrophobic component.

the ink jet recording liquid in which monomer which constitutes the hydrophilic component of the water soluble resin is one or more monomers selected from a group consisting of acrylic acid, methacrylic acid, and (anhydrous) maleic acid, the ink jet recording liquid in which monomer which constitutes the hydrophobic component of the water soluble resin is one or more monomers selected from a group consisting of styrene, alkylester of (meth) acrylic acid, and aryl and alkylarylester of (meth) acrylic acid, the ink jet recording liquid in which HLB of the water soluble resin is in a range from 8.5 to 30.0, and the content of the water soluble resin is 0.1% by weight or higher, the ink jet recording liquid in which the viscosity of the ink jet recording liquid is in a range from 1.5 to 6.0 mPa·s, an ink jet recording method for printing the ink jet recording liquid described above by means of ink jet recording, and the ink jet recording method in which the ink jet recording is thermal ink jet recording.

DETAILED DESCRIPTION OF THE PREFERRED EMBODIMENTS

The preferred embodiments are described in detail hereinafter.

An ink jet recording liquid of the present invention contains pigment, water soluble organic solvent, and water as the essential components, and further contains water soluble resin and/or surfactant.

The pigment used in an ink jet recording liquid of the present invention may be organic pigment or inorganic pigment.

Examples of black pigment include carbon black pigment such as furnace black, lamp black, acetylene black, and channel black. Specified color pigment such as red, green, blue, brown, and white, metallic luster pigment such as gold color pigments and silver color pigment, achromatic or hypochromic extender pigment, and plastic pigments may be used, in addition to black and three primary colors of cyan, magenta, and yellow. Alternatively, newly synthesized pigment for the present invention may be used.

Examples of black pigment include Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080, Raven 1060 (these are products of Columbian Carbon Ltd.), Regal 400R, Regal 330R, Regal 660R, Mogul L, Black Pearls L, Monarch 700, Monarch 800, Monarch 880, Monarch 900, Monarch 1000, Monarch 1100, Monarch 1300, Monarch 1400(these are products of Cabot Specialty Chemicals, Inc.), Color Black FW1, Color Black FW2, Color Black FW2V, Color Black 18, Color Black FW200, Color Black S150, Color Black S160, Color Black S170, Printex 35, Printex U, Printex V, Printex 140U, Printer 140V, Special Black 6, Special Black 5, Special Black 4A, Special Black 4 (these are products of Degussa-Huls AG), No. 25, No. 33, No. 40, No. 47, No. 52, No. 900, No. 2300, MCF-88, MA600, MA7, MA8, MA100 (Mitsubishi Chemical Corp.), however the black pigment is by no means limited to these examples.

Though it is difficult to discuss uniformly the structure of preferred carbon black, a carbon black having the particle size of 15 to 30 nm, BET specific surface area of 70 to 300 $m^2/g$, DBP oil absorption of 0.5 to $1.0 \times 10^{-3} l/g$, volatile component of 0.5 to 10% by weight, and ash of 0.01 to 1.0% by weight is preferably used. The particle size of dispersed particles in a recording liquid is possibly large if the quality of carbon black is outside the above-mentioned range.

Examples of cyan color pigment include C. I. Pigment Blue-1, C. I. Pigment Blue-2, C. I. Pigment Blue-3, C. I. Pigment Blue-15, C. I. Pigment Blue-15:1, C. I. Pigment Blue-15:3, C. I. Pigment Blue-15:34, C. I. Pigment Blue-16, C. I. Pigment Blue-22, and C. I. Pigment Blue-60, however the cyan color pigment is by no means limited to these examples.

Examples of magenta color pigment include C. I. Pigment Red-5, C. I. Pigment Red-7, C. I. Pigment Red-12, C. I. Pigment Red-48, C. I. Pigment Red-48:1, C. I. Pigment Red-57, C. I. Pigment Red-112, C. I. Pigment Red-122, C. I. Pigment Red-123, C. I. Pigment Red-146, C. I. Pigment Red-168, C. I. Pigment Red-184, and C. I. Pigment Red-202, however the magenta color pigment is by no means limited to these examples.

Examples of yellow color pigment include C. I. Pigment Yellow-1, C. I. Pigment Yellow-2, C. I. Pigment Yellow-3, C. I. Pigment Yellow-12, C. I. Pigment Yellow-13, C. I. Pigment Yellow-14, C. I. Pigment Yellow-16, C. I. Pigment Yellow-17, C. I. Pigment Yellow-73, C. I. Pigment Yellow-74, C. I. Pigment Yellow-75, C. I. Pigment Yellow-83, C. I. Pigment Yellow-93, C. I. Pigment Yellow-95, C. I. Pigment Yellow-97, C. I, Pigment Yellow-98, C. I. Pigment Yellow-114, C. I. Pigment Yellow-128, C. I. Pigment Yellow-129, C. I. Pigment Yellow-151, and C. I. Pigment Yellow-154, however the yellow color pigment is by no means limited to these examples.

Water self-dispersible pigment may be used as the pigment used in the ink jet recording liquid of the present invention. The water self-dispersible pigment is a pigment having many water dissolving groups on the pigment surface which is stably dispersible in water without the presence of polymer dispersant. In detail, the water self-dispersible pigment can be obtained by means of a method in which a usual so-called pigment is subjected to surface modification treatment such as acid/base treatment, coupling agent treatment, polymer grafting treatment, plasma treatment, or oxidation/reduction treatment. A test method, in which pigment of 5% by weight is dispersed in water of 95% by weight by use of an ultrasonic homogenizer, a nanomizer, a micro-fluidizer, or ball mill, the initial pigment concentration is measured, the dispersion is still stood for one day in a glass bottle, and then the pigment concentration of supernatant is measured, is applied to check whether the pigment is water self-dispersible pigment or not, and if the pigment concentration in supernatant/initial concentration is 98% or larger, then the tested pigment is regarded as a water self-dispersible pigment.

Examples of water self-dispersible pigment include Cab-o-jet-200, Cab-o-jet 300, and IJX-55 supplied by Cabot Specialty Chemicals, Inc., Microjet Black CW-1 supplied by Orient Chemical Industries Ltd., and pigment supplied by Nippon Shokubai Co., Ltd. in addition to pigments which are subjected to surface modification treatment as described hereinabove.

Water dissolving group sited on the surface of water self-dispersible pigment may be any one of nonionic, cationic, and anionic group, however sulfonic acid, carboxylic acid, hydroxyl group, or phosphoric acid is preferably used mainly. In the case of sulfonic acid, carboxylic acid, and phosphoric acid, it is possible to use these acids as free acid, however it is preferable to use these acids in the form of salt with basic substance. Examples of basic substance for forming a salt with these polymers include alkali metals such as sodium, potassium, and lithium, aliphatic amines such as monomethyl amine, dimethyl amine, and triethyl amine, alcoholamines such as monomethanol amine, monoethanol amine, diethanol amine, triethanol amine, and diisopropanol amine, and ammonia. Among these compounds, basic compounds of alkali metals such as sodium, potassium, and lithium are preferably used. The reason is probably that the basic compound of alkali metal is a strong electrolyte and effective on dissociation of the acidic group.

The content of the pigment used in the ink jet recording liquid of the present invention is preferably in a range from 0.5 to 20% by weight and more preferably in a range from 1 to 10% by weight. The pigment content less than 0.5% by weight gives insufficient image density, and on the other hand, the pigment content higher than 20% by weight results in deteriorated rub resistance.

Examples of the water soluble organic solvent used in the ink jet recording liquid of the present invention include polyhydric alcohols such as ethyleneglycol, diethyleneglycol, propyleneglycol, butyleneglycol, triethyleneglycol, 1, 5-pentanediol, 1,2,6-hexanetriol, and glycerin, polyhydric alcohol derivatives such as ethyleneglycol monomethylether, ethyleneglycol monoethylether, ethyleneglycol monobutylether, diethyleneglycol monomethylether, diethyleneglycol monoethylether, diethyleneglycol monobutylether, propyleneglycol monobutylether, dipropyleneglycol monobutylether, and ethyleneoxide adducts of diglycerin, nitrogen-containing solvents such as pyrrolidone, N-methyl-2-pyrrolidone, cyclohexylpyrrolidone, and triethanolamine, alcohols such as ethanol, isopropylalcohol, butylalcohol and benzylalcohol, and sulfur-containing solvent such as thiodiethanol, thiodiglycerol, sulfolane, and dimethylsulfoxide, and other solvents such as propylenecarbonate and ethylenecarbonate.

Water soluble organic solvents may be used solely or mixedly with two or more solvents. The water soluble organic solvent content in the ink jet recording liquid is preferably in a range from 1 to 60% by weight, and more preferably in a range from 5 to 40% by weight. The content less than 1% by weight results in deteriorated long term preservation stability and on the other hand the content higher than 60% by weight results in poor jetting of the ink.

Examples of water used in the present invention include pure water, ultra-pure water, distilled water, and ion-exchanged water.

The ink jet recording liquid of the present invention contains one of or both water soluble resin and surfactant in addition.

Effective examples of water soluble resin used in the ink jet recording liquid of the present invention include compounds having both hydrophilic structure and hydrophobic structure, in detail condensation polymers and addition polymers are included. Examples of condensation polymer include known polyester base polymers, and example of addition polymer include addition polymers having $\alpha$, $\beta$-ethylenic unsaturated group. For example, copolymers formed by copolymerization of monomer having hydrophilic group and $\alpha$, $\beta$-ethylenic unsaturated group and monomer having hydrophobic group and $\alpha$, $\beta$-ethylenic unsaturated group are used in suitable combination. Furthermore, homopolymers formed by polymerization of monomer having hydrophilic group and $\alpha$, $\beta$-ethylenic unsaturated group may be used.

For example, monomers having carboxyl group, sulfonic group, hydroxyl group, and phosphoric group such as acrylic acid, methacrylic acid, crotonic acid, itaconic acid, monoester of itaconic acid, maleic acid, monoester of maleic acid, fumaric acid, monoester of fumaric acid, vinylsulfonate, styrene-sulfonic acid, vinylnaphthalene sulfonate, vinylalcohol, acrylamide, methacryloxyethyl phosphate, bis-methacryloxyethyl phosphate, methacryloxyethylphenyl acid-phosphate, ethylenediglycol dimethacrylate, and diethyleneglycol dimethacrylate may be used as the monomer having hydrophilic group and $\alpha$, $\beta$-ethylenic unsaturated group.

On the other hand, for example, styrene derivatives such as styrene, $\alpha$-methylstyrene, and vinyltoluene, vinylcyclohexane, vinylnaphthalene, vinylnaphthalene derivatives, alkylacrylate ester, phenylacrylate ester, alkylmethacrylate ester, phenylmethacrylate ester, cycloalkylmethacrylate ester, alkylcrotonate ester, dialkylitaconate ester, and dialkylmaleate ester may be used as the monomer having hydrophobic group and $\alpha$, $\beta$-ethylenic unsaturated group.

The copolymer obtained by copolymerizing monomers having the above-mentioned hydrophilic group and hydrophobic group may be random, block, or graft copolymer. Examples of preferable copolymer include styrene-styrenesulfonic acid copolymer, styrene-maleic acid copolymer, styrene-methacrylic acid copolymer, styrene-acrylic acid copolymer, vinylnaphthalene-maleic acid copolymer, alkylacrylate ester-acrylic acid copolymer, vinylnaphthalene-acrylic acid copolymer, alkylacrylate ester-acrylic acid copolymer, alkylmethacrylate ester-methacrylic acid copolymer, styrene-alkylmethacrylate ester-methacrylic acid copolymer, styrene-alkylacrylate ester-acrylic acid copolymer, styrene-phenylmethacrylate ester-methacrylic acid copolymer, and styrene-cyclohexylmethacrylate ester-mathacrylic acid copolymer.

Monomer having polyoxyethylene group or hydroxyl group may be copolymerized to these copolymers suitably. Alternatively, monomer having cationic functional group such as N-dimethylaminoethylmethacrylate, N,N-dimethylaminoethylacrylate, N,N-dimethylaminomethacryloamide, N,N-dimethylaminoacrylamide, N-vinylpyrrole, N-vinylpyridine, N-vinylpyrrolidone, or N-vinylimidazole may be copolymerized to these copolymers suitably to improve the affinity for the pigment having acidic functional group on the surface and to stabilize the dispersion.

As a water soluble resin, polystyrenesulfonic acid, polyacrylic acid, polymethacrylic acid, polyvinylsulfonate, polyalginic acid, polyoxyethylene-polyoxypropylene-polyoxyethylene blockcopolymer, formalin condensate of naphthalenesulfonate, polyvinylpyrrolidone, polyethyleneimine, polyamines, polyamides, polyvinylimidazole, aminoalkylacrylate-acrylamide copolymer, chitosan, polyoxyethylenealkylether, polyoxyethylenealkylphenyl ether, polyoxyethylene fatty acid amide, polyvinylalcohol, polyacrylamide, cellulose derivatives such as carboxyethylcellulose, and polysaccharide and its derivatives may be effectively used.

Hydrophilic group of the water soluble resin is preferably carboxylic acid or salt of carboxylic acid though not restricted to these carboxylic compounds. The reason is believed to be that pigment coagulates suitably on a paper in the case that carboxylic acid is used as the hydrophilic group.

In the case that the hydrophilic group of the copolymer of these water soluble resins is acidic group, it is preferable to use the acidic group in the form of salt with a basic substance to increase the water solubility. Examples of basic substance which forms a salt with these polymers include alkali metals such as sodium, potassium, and lithium, fatty amines such as monomethylamine, dimethylamine, and triethylamine, alcohol amines such as monomethanolamine, monoethanolamine, diethanolamine, triethanolamine, and diisopropanolamine, and ammonia. Among these basic substances, basic compounds of alkali metals such as sodium, potassium, and lithium are preferably used. The reason is that alkali metals are strong electrolyte and acts on the hydrophilic group to dissociate.

Neutralization of 50% or higher of acid value of copolymer is preferable for a water soluble resin, and neutralization of 80% or higher of acid value of copolymer is more preferable.

A water soluble resin having a weight average molecular weight in a range from 2000 to 15000 is preferably used, and having a weight average molecular weight in a range from 3500 to 10000 is more preferably used. The preferable structure and composition ratio of the hydrophilic component and hydrophobic component may be selected suitably from among combinations with pigment and solvent.

These water soluble resins may be used solely or in combination of two or more water soluble resins. The content of water soluble resin is not defined uniformly because the suitable content significantly depends on pigment, however in general, preferably in a range from 0.1 to 100% by weight based on the pigment, more preferably in a range from 1 to 70% by weight, and further more preferably in a range from 3 to 50% by weight.

Anion surfactants, cationic surfactants, amphoteric surfactants, and nonionic surfactants may be all used as the surfactant used in the ink jet recording liquid of the present invention.

Examples of anionic surfactant include alkylbenzenesulfonate salts, alkylphenylsulfonate salts, alkylnaphthalenesulfonate salts, higher fatty acid salts, sulfate ester salts of higher fatty acid esters, sulfonate salts of higher fatty acid esters, sulfate ester salt and sulfonate salt of higher alcoholethers, higher alkylsulfosuccinate salt, higher alkylphosphate ester salts, and phosphate ester salts of higher alcoholethyleneoxide adducts, and for example, dodecylbenzenesulfonate salts, kerylbenzenesulonate salts, isopropylnaphthalenesulfonate salts, monobutylphenylphenolmonosulfonate salts, monobutyl-biphenylsulfonate salts, monobutyl-biphenylsulfonate salts, and dibutylphenylphenol-disulfonate salts are used effectively.

Examples of nonionic surfactants include, for example, polypropyleneglycol ethyleneoxide adducts, polyoxyethylenenonylphenylether, polyoxyethyleneoctylphenylether, polyoxyethylenedodecylphenylether, polyoxyethylenealkylether, polyoxyethylene fatty acid esters, sorbitan fatty acid esters, polyoxyethylene sorbitan fatty acid esters, fatty acid alkylolamides, acetyleneglycol, oxyethylene adducts of acetyleneglycol, aliphatic alkanolamides, glycerin esters, and sorbitan esters.

Examples of cationic surfactants include tetraalkylammonium salts, alkylamine salts, benzalconium salts, alkylpyridinium salts, and imidazolium salts, for example, dihydroxyethylstearylamine, 2-heptadecenylhydroxyethylimidazoline, lauryldimethylbenzyl ammonium chloride, cetylpyridinium chloride and stearamide methylpyridinium chloride are used.

Otherwise, silicone base surfactants such as polysiloxaneoxyethylene adducts, fluorine base surfactants such as perfluoroalkyl carboxylate salts, perfluoroalkyl sulfonate salts, and oxyethylene perfluoroalkylethers, and biosurfactants such as spiculisporic acid, rhamnolipide, lysolecithin may be used.

Preferable examples of the surfactant include polypropyleneglycol-ethyleneoxide adducts, oxyethylene adducts of acetyleneglycol, and polyoxyethylenealkylether.

The content of the surfactant in the ink jet recording liquid is preferably lower than 10% by weight, and more preferably in a range from 0.01 to 5% by weight. The content of the surfactant higher than 10% by weight often results in reduced optical density.

The method for preparation of the ink jet recording liquid of the present invention is not particularly limited, and known various methods for preparation of ink jet recording liquid may be employed. For example, a method in which a prescribed amount of pigment is added to an aqueous solution containing a prescribed amount of polymer dispersant, the mixture is stirred sufficiently and dispersed by use of a disperser, coarse particles are removed by means of centrifugal separation, prescribed solvent and additives are added and the mixture is stirred, mixed, and filtered may be used for preparation of an ink jet recording liquid. At that time, a modified method in which a pigment concentrated dispersion is prepared first and then diluted when an ink jet recording liquid is prepared may be used. The pigment may be milled before dispersion process. Alternatively, prescribed amounts of solvent, water, and polymer dispersant are mixed and pigment is added, and the mixture may be dispersed by use of a disperser. Examples of the disperser include a colloid mill, flow jet mill, slasher mill, high speed disperser, ball mill, attritor, sand mill, sand grinder, ultrafine mill, , Eiger motor mill, Dyno mill, perl mill, agitator mill, co-ball mill, extruder with two rolls or three rolls, kneader, micro-fluidizer, laboratory homogenizer, and ultrasonic homogenizer, and these dispersers may be used solely or in combination. A dispersion method in which a dispersion medium is not used is preferably employed to prevent the contamination of inorganic impurity, and a microfluidizer or an ultrasonic homogenizer is suitably used. In examples of the present invention, an ultrasonic homogenizer was used for dispersion.

On the other hand, as the method for preparation of the ink jet recording liquid using water self-dispersible pigment, for example, a method in which pigment is subjected to surface modification treatment, the obtained pigment is added to water, the mixture is stirred sufficiently and dispersed by use of a disperser as required, coarse particles are removed by means of centrifugal separation, prescribed solvent and additives are added and the mixture is stirred, mixed, and filtered may be employed to prepare an ink jet recording liquid.

In addition to the above-mentioned components, polyethyleneimine, polyamines, polyvinylpyrrolidone, polyethyleneglycol, cellulose derivatives such as ethylcellulose and carboxymethylcellulose, polysaccharides and derivatives thereof, water soluble polymers, polymer emulsions such as acrylic polymer emulsions and polyurethane emulsions, cyclodextrin, large ring amines, dendrimer, crown ethers, urea and derivatives thereof, and acetoamide may be added to the ink jet recording liquid of the present invention to control the ink characteristics. Furthermore, to control the conductivity and pH, compounds of alkali metals such as potassium hydroxide, sodium hydroxide, or lithium hydroxide, nitrogen-containing compounds such as triethanolamine, diethanolamine, ethanolamine, and 2-amino-2-methyl-1-propanol, compounds of alkaline earth metals such as calcium hydroxide, acids such as sulfuric acid, hydrochloric acid, and nitric acid, and salts of strong acids and weak bases such as ammonium sulfate may be added.

Furthermore, pH buffers, oxidation inhibitors, antifungal agents, viscosity regulating agents, conducting agents, ultraviolet ray absorbers, chelating agents, water soluble dyes, disperse dyes, oil soluble dyes may be added as required.

pH of the ink jet recording liquid of the present invention is not particularly limited, however, pH is preferably in a range from 3 to 11, and more preferably in a range from 4.5 to 9.5. pH of the ink jet recording liquid lower than 3 or exceeding 11 often results in poor ink preservation stability.

In the case of the ink jet recording liquid containing pigment having anionic free radical on the surface of the pigment, pH is preferably in a range from 6 to 11, more preferably in a range from 6 to 9.5, and further more preferably in a range from 7.5 to 9.0. On the other hand, in the case of the ink containing pigment having cationic free radical on the surface of the pigment, pH is preferably in a range from 4.5 to 8.0, and more preferably in a range from 4.5 to 7.0.

The ink jet recording liquid of the present invention is used for ink jet recording by means of ink jet recording method. Any one of piezo ink jet type ink recording, thermal ink jet type ink jet recording, etc. method may be employed, however, thermal ink jet type is suitably used.

The ink jet recording liquid of the present invention may be used not only for a normal ink jet recording apparatus but also for a recording apparatus equipped with a heater for controlling ink drying and a recording apparatus equipped with an intermediate transfer mechanism in which printing material is printed on an intermediate and then transferred onto a recording medium such as a paper.

Operation

In general, when a pigment ink is printed on a recording medium, the following phenomenon likely occurs.

1. The water content in the ink is reduced due to evaporation and penetration, and pigment coagulates due to reduced dispersion stability of pigment.
2. Pigment penetrates into the recording medium concomitantly with penetration of the ink.

In detail, if the coagulation force is larger than the penetration force, then pigment coagulates near the surface of the recording medium, and is rather difficult to penetrate into the recording medium. Much pigment remains near the surface of the recording medium, and as the result, the optical density is high and the rub resistance is poor. On the other hand, if the coagulation force is smaller than the penetration force, pigment penetrates into the recording medium, and less amount of pigment remains near the surface of the recording medium. As the result, the optical density is low and the rub resistance is improved. In this case, the feathering is poor.

Therefore, the balance between the coagulation force and the penetration force is important to satisfy both optical density and the rub resistance. In view of these results, it was concluded that the requirement of the present invention should be satisfied to give high optical density, excellent rub resistance, and long term preservation stability.

The temporal change rate of dynamic contact angle of the ink jet recording liquid of the present invention on a plain paper is in a range from 0.5 to 3.5 degrees/second, more preferably in a range from 1.0 to 3.0 degrees/second, and further more preferably in a range from 1.25 to 2.5 degrees/second. The temporal change rate of dynamic contact angle exceeding 3.5 degrees/second results in reduced optical density and deteriorated feathering occasionally. The reason is believed to be that the ink penetrates into a plain paper fast. On the other hand, the temporal change rate of dynamic contact angle less than 0.5 degree/second results in deteriorated rub resistance occasionally. The reason is believed to be that pigment coagulates near the surface of a plain paper due to slow penetration of the ink into a plain paper. In the present invention, the plain paper means FX-L paper (product of Fuji Xerox Co., Ltd.).

The above-mentioned FX-L paper (product of Fuji Xerox Co., Ltd.) was used in the measurement of the dynamic contact angle in the present invention, a 4.0 $\mu$l of ink was set on a plain paper, and the temporal change of dynamic contact angle was measured by use of a FIBRO 1100 DATMK II (product of FIBRO system). In the present invention, the value obtained by dividing the dynamic contact angle change during 10 seconds from starting of the measurement by the measurement time (10 seconds) is used as the temporal change rate of dynamic contact angle.

A method for controlling the temporal change rate of dynamic contact angle is described hereunder.

In general, the temporal change rate of dynamic contact angle depends mainly on the surfactant, and is apt to be determined dependently on the type of surfactant unconditionally. In detail, in the case that a highly penetrative surfactant is used, the temporal change rate of dynamic contact angle is aptly large even though a small amount of the surfactant is added. On the other hand, in the case that a less penetrative surfactant is used, a large amount of the surfactant is required to be added to increase the temporal change rate of dynamic contact angle, however a large amount of the added surfactant results in poor pigment dispersion occasionally. To control the temporal change rate of dynamic contact angle, it is required to set the content of rather less penetrative surfactant to be added in a suitable range, and furthermore the proper selection of a combination of surfactant and penetrative water soluble organic solvent may be the effective way to control the temporal change rate of dynamic contact angle.

In general, the temporal change rate of dynamic contact angle is correlative with the penetrability and drying time, an ink jet recording liquid having a high temporal change rate of dynamic contact angle exhibits high penetrability and short drying time, and on the other hand, an ink jet recording liquid having a low temporal change rate of dynamic contact angle exhibits low penetrability and long drying time. The drying time of an ink jet recording liquid which satisfies the requirement of the present invention is generally about 10 seconds with some exceptions.

The number average particle diameter of dispersed particles contained in the ink jet recording liquid of the present invention is in a range from 15 to 100 nm and the volume average particle diameter is in a range from 30 to 200 nm. In the case that both values are in these ranges respectively, the optical density is high and the rub resistance is excellent. If the number average particle diameter of dispersed particles exceeds 100 nm, or the volume average particle diameter exceeds 200 nm, the rub resistance is poor. The reason is believed to be that the particle diameter of coagulated pigment becomes large with increasing the diameter of dispersed particles. On the other hand, if the number average particle diameter of dispersed particles is smaller than 15 nm or the volume average particle diameter is smaller than 30 nm, the ink viscosity is high and a nozzle is apt to be clogged. The number average particle diameter of dispersed particles is preferably in a range from 15 to 80 nm, and more preferably in a range from 20 to 70 nm, though the above-mentioned range is allowable. The volume average particle diameter of dispersed particles is preferably in a range from 30 to 170 nm, and more preferably in a range from 30 to 150 nm, though the above-mentioned range is allowable.

In the present invention, the measurement of the number average particle diameter and the volume average particle diameter was carried out by use of a micro-track UPA particle size analyzer 9340 (product of Leeds & Northrup). In measurement, 4 ml of ink jet recording liquid was placed in a measurement cell and the measurement was carried out according to the prescribed measurement procedure. As the parameter to be entered for measurement, the viscosity of ink jet recording liquid was entered as the viscosity and the density of pigment was entered as the density of dispersed particles. The instrument measures the particle diameter by means of Brownian motion of the dispersion medium, in detail, a laser light is irradiated into a solution and scattered light is measured to determine the particle diameter.

The viscosity of the ink jet recording liquid of the present invention is preferably in a range from 1.5 to 6.0 mPa·s, and more preferably in a range from 1.5 to 4.0 mPa·s. The viscosity of the ink jet recording liquid exceeding 6.0 mPa·s results in insufficient rub resistance. The reason is believed to be that the penetrability into a plain paper is low and pigment remains near the surface of the plain paper. On the other hand, the viscosity of the ink jet recording liquid lower than 1.5 mPa·s results in insufficient optical density. The reason is believed to be that the penetrability into a plain paper is too high and pigment or coagulated pigment penetrates into the internal of the plain paper.

HLB of the water soluble resin in the ink jet recording liquid of the present invention is preferably in a range from 8.5 to 30.0. HLB of the water soluble resin lower than 8.5 results in poor rub resistance occasionally. The reason is believed to be that the dispersion stability becomes poor to results in poor penetrability of the ink. On the other hand, HLB of the water soluble resin exceeding 30.0 results in low optical density occasionally. The reason is believed to be that the penetrability of the ink is too high.

In the present invention, the HLB value of the water soluble resin calculated based on Davies method was used. For calculation of the HLB, the water soluble resin was divided into the hydrophilic component and hydrophobic component, and HLB of both components were calculated according to the equation (1). Next, the value obtained by weight averaging these HLB values is defined as HLB of the water soluble resin according to the equation (2).

Equation 1

$$HLBx = 7 + \Sigma(\text{number of hydrophilic group}) + \Sigma(\text{number of hydrophobic group}) \quad (1)$$

Equation 2

$$HLB = [\Sigma(Wx \times HLBx)]/\Sigma Wx \quad (2)$$

In the equations, HLBx denotes HLB of only a hydrophilic component and only a hydrophobic component, and Wx denotes respective weights of the hydrophilic component and hydrophobic component.

EXAMPLE

The present invention will be described in detail hereinafter with reference to examples.

Pigment Dispersion Method 1

Water soluble resin and ion-exchanged water were added to pigment, and the mixture was dispersed by use of a ultrasonic homogenizer. The solution was subjected to centrifugal separation (8000 rpm×30 min) to remove the residue. The solution was filtered by passing a 1 μm filter to obtain a pigment dispersion liquid.

Pigment Dispersion Method 2

Water self-dispersible pigment was dispersed in water to prepare an aqueous dispersion and the dispersion was subjected to centrifugal separation (8000 rpm×30 min) by use of a centrifugal separator, the residue (20% based on the total) was removed to obtain a pigment dispersion.

Pigment Dispersion Method 3

Pigment which had been subjected to plasma treatment was added in ion-exchanged water so that the pigment concentration was adjusted to 20% by weight, and the mixture was dispersed by use of a high pressure homogenizer. The dispersion was subjected to centrifugal separation (8000 rpm×30 min) by use of a centrifugal separator, the residue (20% based on the total) was removed to obtain a pigment dispersion.

Pigment Dispersion Method 4

Pigment was subjected to surface oxidation treatment with sodium hypochlorite, and then subjected to desalination treatment. The surface-treated pigment obtained as described hereinabove was added in ion-exchanged water, pH was adjusted to 7.5, and dispersed by use of a ultrasonic homogenizer. The dispersion was subjected to centrifugal separation (8000 rpm×30 min) by use of a centrifugal separator, and the residue (20% based on the total) was removed to obtain a pigment dispersion.

Ink Jet Recording Liquid Preparation Method

A suitable amount of water soluble organic solvent, surfactant, and ion-exchanged water was added to a suitable amount of the above-mentioned pigment dispersion so that the total amount was adjusted to 100 parts by weight and the pigment concentration was adjusted to 5% by weight. This dispersion was mixed and stirred and filtered through a 1 μm filter to obtain a target ink jet recording liquid.

Example 1

An ink jet recording liquid having a composition described hereunder was obtained according to the above-mentioned dispersion method 1 and the ink jet recording liquid preparation method described hereinabove.

| | |
|---|---|
| Carbon black (Black pearls L: product of Cabot Specialty Chemicals, Inc.) | 5 parts by weight |
| Styrene-methacrylic acid-sodium methacrylate copolymer (St:MAA = 33:67/(weight average molecular weight = about 6200/HLB = 17.8) | 1.5 parts by weight |
| Ethyleneglycol | 15 parts by weight |
| Surfactant (Pluronic PE 6400: product of BASF Corporation) | 0.2 part by weight |
| Isopropyl alcohol | 3 parts by weight |
| Urea | 5 parts by weight |
| Ion-exchanged water | rest |
| total | 100 parts by weight |

The temporal change rate of dynamic contact angle of the obtained ink jet recording liquid was 2.5 degrees/second, the number average particle diameter was 31 nm, the volume average particle diameter was 61 nm, and the viscosity was 2.7 mPa·s.

Example 2

An ink jet recording liquid having a composition described hereunder was obtained according to the above-mentioned dispersion method 1 and the ink jet recording liquid preparation method described hereinabove.

| | |
|---|---|
| Carbon black (Raven 1080/Columbian Carbon Ltd.) | 5 parts by weight |
| Styrene-acrylic acid-sodium acrylate copolymer (St:AA = 33:67/(weight average molecular weight = about 6100/HLB = 17.4) | 1.5 parts by weight |
| Propyleneglycol | 10 parts by weight |
| Diglycerin ethyleneoxide adducts | 10 parts by weight |
| Surfactant (Pluronic PE 3100: product of BASF Corporation) | 0.3 part by weight |
| Isopropyl alcohol | 3 parts by weight |
| Urea | 3 parts by weight |
| Ion-exchanged water | rest |
| total | 100 parts by weight |

The temporal change rate of dynamic contact angle of the obtained ink jet recording liquid was 2.6 degrees/second, the number average particle diameter was 57 nm, the volume average particle diameter was 113 nm, and the viscosity was 3.6 mPa·s.

Example 3

An ink jet recording liquid having a composition described hereunder was obtained according to the above-mentioned dispersion method 3 and the ink jet recording liquid preparation method described hereinabove.

| | |
|---|---|
| Surface treated pigment (MA-100: Mitsubishi Chemical Corp.) | 4 parts by weight |
| 2-ethylhexyl methacrylate-methacrylic acid-sodium methacrylate copolymer (2-EHMA:MAA = 50:50/(weight average molecular weight = about 4700/HLB = 11.4) | 1.5 parts by weight |
| Diethyleneglycol | 10 parts by weight |
| Diglycerin ethyleneoxide adduct | 5 parts by weight |
| Isopropyl alcohol | 3 parts by weight |
| Urea | 4 parts by weight |
| Ion-exchanged water | rest |
| total | 100 parts by weight |

The temporal change rate of dynamic contact angle of the obtained ink jet recording liquid was 1.1 degrees/second, the number average particle diameter was 50 nm, the volume average particle diameter was 114 nm, and the viscosity was 2.8 mPa·s.

Example 4

An ink jet recording liquid having a composition described hereunder was obtained according to the above-mentioned dispersion method 2 and the ink jet recording liquid preparation method described hereinabove.

| | |
|---|---|
| Surface treated pigment (Cab-o-jet-300: Cabot Specialty Chemicals, Inc.) | 4 parts by weight |
| n-butylmethacrylate-methacrylic acid-sodium methacrylate copolymer (nBMA:MAA = 33:67/(weight average molecular weight = about 4400/HLB = 17.4) | 1 part by weight |
| Propyleneglycol | 15 parts by weight |
| Surfactant (Pluronic PE 6400: product of BASF Corporation) | 0.03 part by weight |
| Isopropyl alcohol | 3 parts by weight |
| Ion-exchanged water | rest |
| total | 100 parts by weight |

The temporal change rate of dynamic contact angle of the obtained ink jet recording liquid was 2.3 degrees/second, the number average particle diameter was 43 nm, the volume average particle diameter was 90 nm, and the viscosity was 2.5 mPa·s.

Example 5

An ink jet recording liquid having a composition described hereunder was obtained according to the above-mentioned dispersion method 3 and the ink jet recording liquid preparation method described hereinabove.

| | |
|---|---|
| Surface treated pigment (C. I. Pigment Blue 15:3) | 4 parts by weight |
| Styrene-acrylic acid-sodium acrylate copolymer (St:AA = 33:67/(weight average molecular weight = about 6100/HLB = 17.4) | 1.2 parts by weight |
| Diglycerin ethyleneoxide adduct | 5 parts by weight |
| Surfactant (Nonion E-215:NOF Corp.) | 0.03 part by weight |
| Ion-exchanged water | rest |
| total | 100 parts by weight |

The temporal change rate of dynamic contact angle of the obtained ink jet recording liquid was 1.6 degrees/second, the number average particle diameter was 63 nm, the volume average particle diameter was 125 nm, and the viscosity was 1.9 mPa·s.

Example 6

An ink jet recording liquid having a composition described hereunder was obtained according to the above-mentioned dispersion method 4 and the ink jet recording liquid preparation method described hereinabove.

| | |
|---|---|
| Surface treated pigment (Monarch 880 Cabot Specialty Chemicals, Inc.) | 4 parts by weight |
| Diethyleneglycol | 5 parts by weight |
| Glycerin | 5 parts by weight |
| Sulfolane | 5 parts by weight |
| Surfactant (Nonion E-230: Nippon Oils & Fats Co., Ltd.) | 0.6 part by weight |
| Surfactant (Surfynol 465: Nisshin Chemical Industry Ltd.) | 0.2 part by weight |
| Ion-exchanged water | rest |
| total | 100 parts by weight |

The temporal change rate of dynamic contact angle of the obtained ink jet recording liquid was 2.8 degrees/second, the number average particle diameter was 58 nm, the volume average particle diameter was 121 nm, and the viscosity was 2.7 mPa·s.

Example 7

An ink jet recording liquid having a composition described hereunder was obtained according to the above-mentioned dispersion method 2 and the ink jet recording liquid preparation method described hereinabove.

| | |
|---|---|
| Surface treated pigment (Microjet Black CW-1: Orient Chemical Industries Ltd.) | 4 parts by weight |
| iso-butylmethacrylate-methacrylic acid-sodium methacrylate copolymer (iBMA:MAA = 33:67/(weight average molecular weight = about 6200/HLB = 17.4) | 1 part by weight |
| Propyleneglycol | 15 parts by weight |
| Isopropyl alcohol | 3 parts by weight |
| Urea | 3 parts by weight |
| Ion-exchanged water | rest |
| total | 100 parts by weight |

The temporal change rate of dynamic contact angle of the obtained ink jet recording liquid was 3.3 degrees/second, the number average particle diameter was 36 nm, the volume average particle diameter was 88 nm, and the viscosity was 2.9 mPa·s.

Example 8

An ink jet recording liquid having a composition described hereunder was obtained according to the above-mentioned dispersion method 2 and the ink jet recording liquid preparation method described hereinabove.

| | |
|---|---|
| Surface treated pigment (Cab-o-jet-300: Cabot Specialty Chemicals, Inc.) | 4 parts by weight |
| Styrene-maleic acid-sodium maleate copolymer (St:MA = 50:50/(weight average molecular weight = about 2000/HLB = 28.1) | 1 part by weight |
| Diethyleneglycol ethyleneoxide adduct | 5 parts by weight |
| Propyleneglycol | 5 parts by weight |
| Isopropyl alcohol | 3 parts by weight |
| Urea | 3 parts by weight |
| Ion-exchanged water | rest |
| total | 100 parts by weight |

The temporal change rate of dynamic contact angle of the obtained ink jet recording liquid was 0.7 degree/second, the number average particle diameter was 51 nm, the volume average particle diameter was 115 nm, and the viscosity was 3.1 mPa·s.

Comparative Example 1

An ink jet recording liquid having a composition described hereunder was obtained according to the above-mentioned dispersion method 2 and the ink jet recording liquid preparation method described hereinabove.

| | |
|---|---|
| Surface treated pigment (Cab-o-jet-300: Cabot Specialty Chemicals, Inc.) | 4 parts by weight |
| Diethyleneglycol | 15 parts by weight |
| Urea | 3 parts by weight |
| Surfactant (Surfynol 465: Nisshin Chemical Industry Ltd.) | 0.5 part by weight |
| Surfactant (Nonion E-230: Nippon NOF Corp.) | 0.5 part by weight |
| Ion-exchanged water | rest |
| total | 100 parts by weight |

The temporal change rate of dynamic contact angle of the obtained ink jet recording liquid was 6.4 degrees/second, the number average particle diameter was 41 nm, the volume average particle diameter was 84 nm, and the viscosity was 2.2 mPa·s.

Comparative Example 2

An ink jet recording liquid having a composition described hereunder was obtained according to the above-mentioned dispersion method 1 and the ink jet recording liquid preparation method described hereinabove.

| | |
|---|---|
| Carbon black (Raven 1080/Columbian Carbon Ltd.) | 4 parts by weight |
| Styrene-methacrylic acid-sodium methacrylate copolymer (St:MAA = 33:67/weight average molecular weight about 6200/HLB = 17.8) | 0.4 part by weight |
| Diethyleneglycol | 5 parts by weight |
| Triethyleneglycol | 5 parts by weight |
| Urea | 3 parts by weight |
| Surfactant (NONIPOL 95: Sanyo Chemical Industries, Ltd.) | 0.03 part by weight |
| Ion-exchanged water | rest |
| total | 100 parts by weight |

The temporal change rate of dynamic contact angle of the obtained ink jet recording liquid was 0.4 degree/second, the number average particle diameter was 52 nm, the volume average particle diameter was 100 nm, and the viscosity was 2.2 mPa·s.

Comparative Example 3

An ink jet recording liquid having a composition described hereunder was obtained according to the above-mentioned dispersion method 1 and the ink jet recording liquid preparation method described hereinabove.

| | |
|---|---|
| Carbon black (Raven 1060/ Columbian Carbon Ltd.) | 5 parts by weight |
| Polyoxyethylene nonylphenylether (HLB = 6.5) | 0.75 part by weight |
| Diglycerin ethyleneoxide adduct | 10 parts by weight |
| Diethyleneglycol | 5 parts by weight |
| N,N'-bis(2-hydroxyethyl)-2-aminoethanesulfonic acid | 0.5 part by weight |
| Urea | 3 parts by weight |
| Ion-exchanged water | rest |
| total | 100 parts by weight |

The temporal change rate of dynamic contact angle of the obtained ink jet recording liquid was 0.8 degree/second, the number average particle diameter was 109 nm, the volume average particle diameter was 213 nm, and the viscosity was 2.9 mPa·s.

Test Example

A printer provided with a trial printing head of 400 dpi having 160 nozzles was used for printing. FX-L paper (product of Fuji Xerox Co., Ltd.) was used as the plain paper. Unless particularly mentioned, printing and evaluation were carried out in the normal environment (temperature of 23±0.5 ° C., relative humidity of 55±5 R. H.)

100% coverage pattern and line pattern were printed by use of a trial ink jet recording apparatus, and the printed matter was stood in the normal environment for 24 hours. The rub resistance and optical density were evaluated by use of the 100% coverage pattern, and the feathering was evaluated by use of the line pattern.

Evaluation of Rub Resistance

In evaluation of the rub resistance, white FX-L paper was pressed on a printed matter with a weight of $4.9 \times 10^4$ N/m², the ink transferred to the white FX-L paper was visually evaluated with reference to the previously prepared boundary samples.

Evaluation of Optical Density

The optical density of a printed matter to be tested was measured by use of an X-rite 404 (product of X-rite Co., Ltd.) and the optical density equal to 1.3 or higher is represented by ◯, the optical density equal to 1.2 or higher and lower than 1.3 is represented by Δ, and the optical density lower than 1.2 is represented by ×.

Evaluation of Feathering

The feathering was evaluated visually by comparing the bleeding of the line pattern to that of the previously prepared boundary samples.

Evaluation of Long Term Preservation Stability

To test the long term preservation stability, a cartridge was filled with ink and mounted on an ink jet recording apparatus, and stood for 3 months in the environment of 40° C. for 50 R. H. The ink was used for printing under the normal printing condition for evaluation, and the case in which all the nozzles functioned for printing is represented by ○, the case in which all the nozzles functioned for printing after repeated vacuum maintenance though some nozzles failed to print first is represented by Δ, and the case in which some nozzles failed to print and were not restored by vacuum maintenance is represented by ×.

These results are listed in Table 1.

TABLE 1

|  | dynamic contact angle temporal change rate (degrees/second) | number average particle diameter (nm) | volume average particle diameter (nm) | viscosity (mPa · s) | rub resistance | optical density | feathering | long term preservation stability |
|---|---|---|---|---|---|---|---|---|
| Example 1 | 2.5 | 31 | 61 | 2.7 | ○ | ○ | Δ | ○ |
| Example 2 | 2.6 | 57 | 113 | 3.6 | ○ | ○ | Δ | ○ |
| Example 3 | 1.1 | 50 | 114 | 2.8 | Δ | ○ | ○ | ○ |
| Example 4 | 2.3 | 43 | 90 | 2.5 | ○ | ○ | ○ | ○ |
| Example 5 | 1.6 | 63 | 125 | 1.9 | ○ | ○ | ○ | ○ |
| Example 6 | 2.8 | 58 | 121 | 2.7 | ○ | Δ | Δ | ○ |
| Example 7 | 3.3 | 36 | 88 | 2.9 | ○ | Δ | Δ | ○ |
| Example 8 | 0.7 | 51 | 115 | 3.1 | Δ | ○ | ○ | ○ |
| Comparative example 1 | 6.4 | 41 | 84 | 2.2 | ○ | × | × | ○ |
| Comparative example 2 | 0.4 | 52 | 100 | 2.2 | × | ○ | ○ | ○ |
| Comparative example 3 | 0.8 | 109 | 213 | 2.9 | × | ○ | ○ | × |

It is obvious in Table 1 that the ink jet recording liquids used in Examples 1 to 8 of the present invention are excellent in comparison with the ink jet recording liquids used in Comparative examples 1 to 3 in the rub resistance, optical density, feathering, and long term preservation stability.

As described hereinbefore, according to the present invention, an ink jet recording liquid of high optical density, good rub resistance, and excellent feathering and long term preservation stability in printing on plain paper, and an ink jet recording method in which the ink jet recording liquid is used are obtained.

What is claimed is:

1. A method for producing an ink jet recording liquid containing pigment, water soluble organic solvent, and water, and additionally containing water soluble resin and surfactant, comprising:
    balancing a first and second quality of the surfactant of the ink jet recording liquid to produce a temporal change rate of dynamic contact angle on a plain paper in a range from 0.5 to 3.5 degrees/second,
    such that the number average particle diameter of dispersed particles in said ink jet recording liquid is in a range from 15 to 100 nm, and
    the volume average particle diameter of dispersed particles in said ink jet recording liquid is in a range from 30 to 200 nm.

2. A method for producing an ink jet recording liquid according to claim 1, wherein said pigment is water soluble resin is a polymer dispersion, and said pigment is dispersed by said water soluble resin.

3. A method for producing an ink jet recording liquid according to claim 1, wherein said pigment is water self-dispersible pigment, and said water soluble resin and/or surfactant is anionic or nonionic.

4. A method for producing an ink jet recording liquid according to claim 1, wherein said water soluble resin comprises copolymers having a hydrophilic component and a hydrophobic component.

5. A method for producing an ink jet recording liquid according to claim 4, wherein a monomer unit which constitutes said hydrophilic component of said water soluble resin is one or more monomers selected from the group consisting of acrylic acid, methacrylic acid, and (anhydrous) maleic acid.

6. A method for producing an ink jet recording liquid according to claim 4, wherein a monomer unit which constitutes said hydrophobic component of said water soluble resin is one or more monomers selected from the group consisting of styrene, alkylester of (meth) acrylic acid, and aryl and alkylarylester of (meth) acrylic acid.

7. A method for producing an ink jet recording liquid according to claim 1, wherein HLB of said water soluble resin is in a range from 8.5 to 30.0, and the content of said water soluble resin is 0.1% by weight or higher.

8. A method for producing an ink jet recording liquid according to claim 1, wherein the viscosity of said ink jet recording liquid is in a range from 1.5 to 6.0 mPa's.

9. The method of claim 1, wherein the first quality is penetrativeness of the surfactant and the second quality is quantity of the surfactant.

10. A method for producing an ink jet recording liquid containing pigment, solvent, water, resin and surfactant, comprising:
    balancing a penetrative quality and an amount of the surfactant of the ink jet recording liquid such that a temporal change rate of dynamic contact angle on plain paper for the ink jet recording liquid is in a range from 0.5 to 3.5 degrees/second,
    the number average particle diameter of dispersed particles in said ink jet recording liquid is in a range from 15 to 100 nm, and
    the volume average particle diameter of dispersed particles in said ink jet recording liquid is in a range from 30 to 200 nm.

* * * * *